United States Patent [19]
Zeller et al.

[11] Patent Number: 5,985,226
[45] Date of Patent: Nov. 16, 1999

[54] METHOD OF RECOVERING CHLORINE FROM A GAS MIXTURE

[75] Inventors: Robert L. Zeller; Sharon D. Fritts, both of Youngstown; David L. Johnson, Williamsville, all of N.Y.; Kenneth J. Carlson, Houston, Tex.; Paul J. Orosz, Amherst; Ronald B. Kaplin, Lewiston, both of N.Y.

[73] Assignee: Occidental Chemcial Corporation, Niagara Falls, N.Y.

[21] Appl. No.: 09/003,218

[22] Filed: Jan. 7, 1998

[51] Int. Cl.⁶ .................................................. C01B 7/07
[52] U.S. Cl. ............................. 423/240 S; 95/106; 95/115; 95/132; 423/472; 423/503
[58] Field of Search ............................. 423/240 S, 503, 423/472, 241, 475, 240 R; 95/38, 132, 131, 114, 115, 95, 106, 233

[56] References Cited

U.S. PATENT DOCUMENTS

| | | | |
|---|---|---|---|
| 1,617,305 | 2/1927 | Guyer et al. | 95/132 |
| 1,723,300 | 8/1929 | Pritchard et al. | 423/472 |
| 2,447,834 | 8/1948 | Balcar | 423/240 S |
| 2,750,002 | 6/1956 | Hooker et al. | 95/233 |
| 2,785,055 | 3/1957 | Redcay | 95/233 |
| 3,254,474 | 6/1966 | Van Dijk | 423/240 S |
| 3,357,796 | 12/1967 | Howard et al. | 423/240 S |
| 3,399,537 | 9/1968 | Honigh | 95/233 |
| 3,422,599 | 1/1969 | Hildyard | 95/233 |
| 3,522,007 | 7/1970 | Frevel et al. | 95/132 |
| 3,908,001 | 9/1975 | Symons et al. | 423/472 |
| 4,115,529 | 9/1978 | Behling | 423/472 |
| 5,302,187 | 4/1994 | Itoh et al. | 95/132 |
| 5,500,035 | 3/1996 | Zarchy et al. | 95/132 |

FOREIGN PATENT DOCUMENTS 1086922 of 0000 Canada.

OTHER PUBLICATIONS

Article by A.T. Bozzo et al., Fourth Internat'l Symposium on Fresh Water From The Sea, Heidelberg, Sep. 9–14 (1973), p. 308.

Thesis For Degree of Master of Chemical Engineering, Grad. School, Syracuse University, by Jeffrey R. Kass, "Chlorine Hydrate", Oct. 6, 1967, p. 12.

*Primary Examiner*—Duane S. Smith
*Attorney, Agent, or Firm*—Richard D. Fuerle; Anne E. Brookes

[57] ABSTRACT

Disclosed is a process for separating chlorine gas from a mixture of gases. The mixture of gases is cooled to a temperature less than 0° C. and is contacted with ice, which results in the formation of chlorine hydrate on the ice. The ice is separated from the mixture of gases and is heated or the operating pressure reduced to release chlorine.

20 Claims, 3 Drawing Sheets

METHOD OF RECOVERING CHLORINE FROM A GAS MIXTURE

BACKGROUND OF THE INVENTION

This invention relates to a process for separating chlorine gas from a mixture of gases. In particular, it relates to a process in which a mixture of gases containing chlorine is cooled to less than 0° C. and is contacted with ice, which results in the formation of chlorine hydrate on the ice. To release the chlorine gas from the chlorine hydrate, the ice is separated from the mixture of gases and is heated and/or the operating pressure on the ice is reduced.

In manufacturing chlorine, mixtures of gases that contain chlorine are inevitably produced. While the other gases in the mixture may be harmless, chlorine is toxic and must be removed from the mixture before the mixture can be released to the atmosphere. Many techniques have been used to separate chlorine from mixtures of gases, the particular technique chosen depending upon the concentration of chlorine in the mixture and the other gases that are present.

One technique is to pressurize the gas mixture while adding cold water to form solid chlorine hydrate crystals. The solid chlorine hydrate is separated from the remaining gases and the pressure on it is relieved and/or it is heated, which releases the chlorine. Liquid water is used in this process because it is believed that chlorine gas is insoluble in ice.

SUMMARY OF THE INVENTION

We have discovered that chlorine hydrate will form on the surface of ice and that the formation of chlorine hydrate on the ice can be used to separate chlorine from a mixture of gases. We have further found that the process of this invention can be used to separate chlorine from a mixture of gases where the chlorine is at such low concentrations (i.e., 0.5–60 vol %) that liquid water does not readily form chlorine hydrate.

Figure 1:
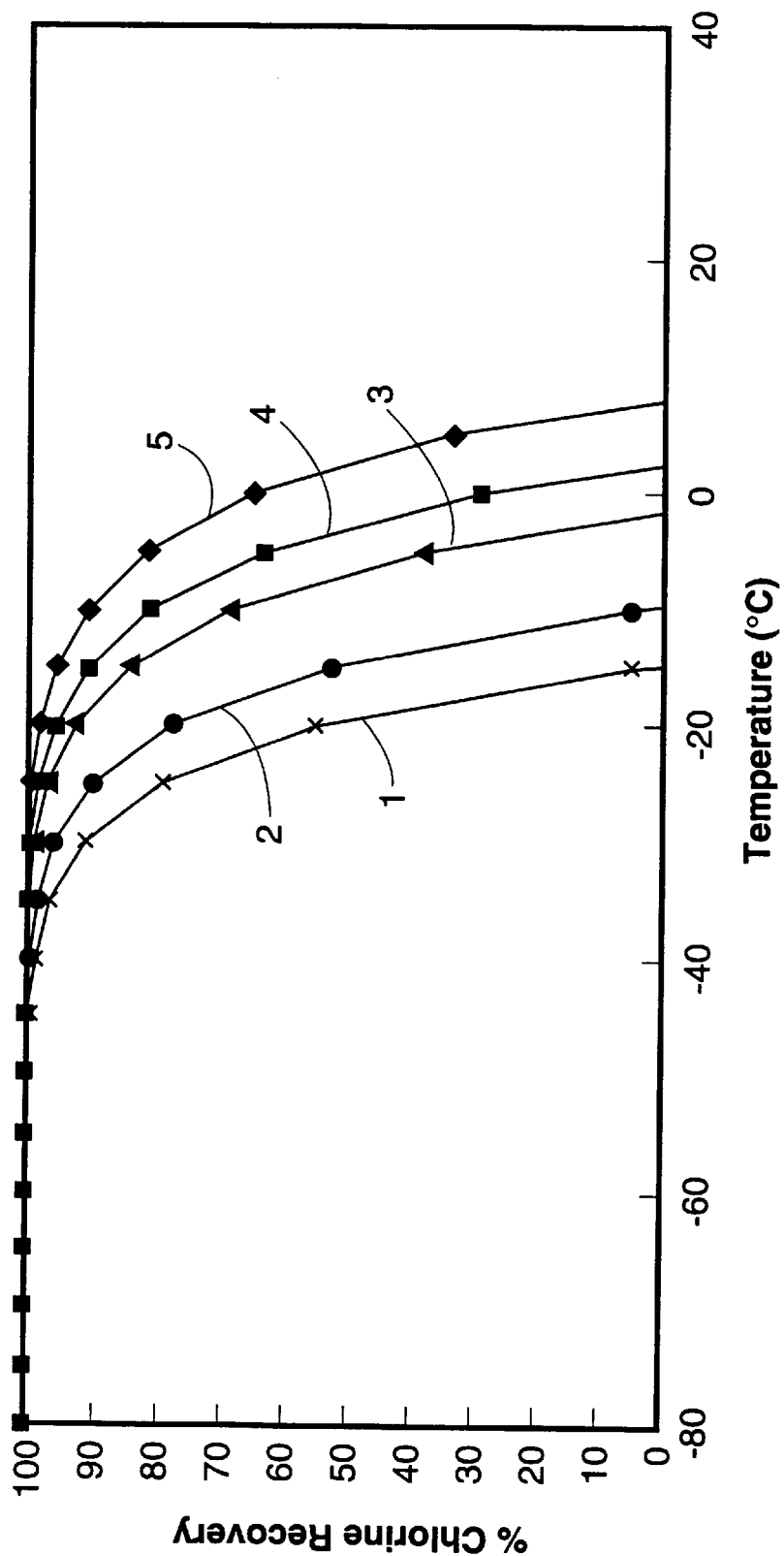
FIG. 1 is a chart where the abscissa is the percentage of chlorine recovered using the process of this invention at temperature given in the ordinate (in °C.) and at 689.5 kPa (100 psig) for input gases containing 0.5 (curve 1), 1 (curve 2), 3 (curve 3), 5 (curve 4), and 10 (curve 5) vol % chlorine.
Figure 2:
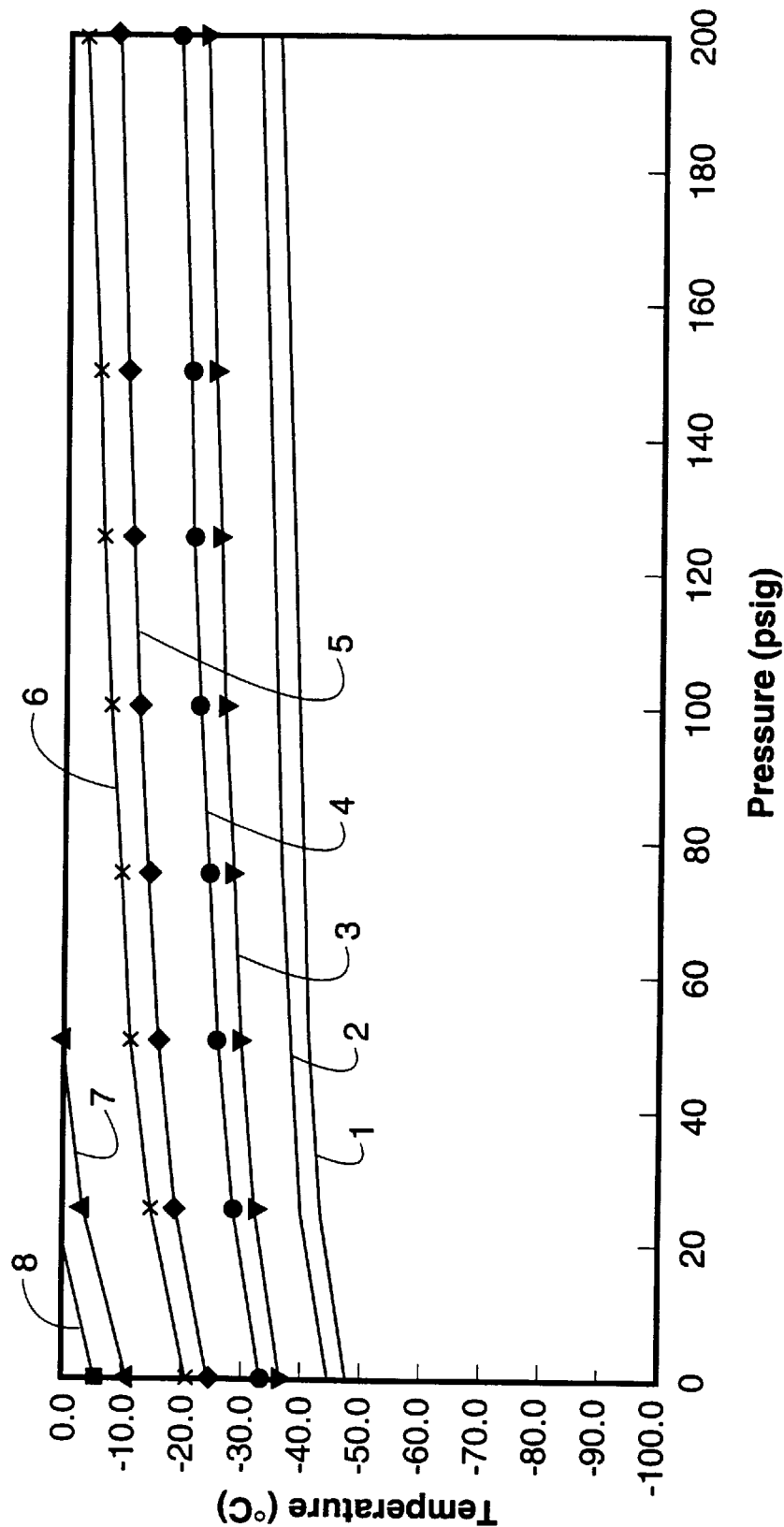
FIG. 2 is a chart showing the relationship between pressure (ordinate) in psig and a temperature (abscissa) in °C. necessary to achieve 25% chlorine recovery when the input gas contains 0.01 (curve 1), 0.02 (curve 2), 0.10 (curve 3), 0.20 (curve 4), 1 (curve 5), 2 (curve 6), 10 (curve 7), and 20 (curve 8) vol % chlorine.
Figure 3:
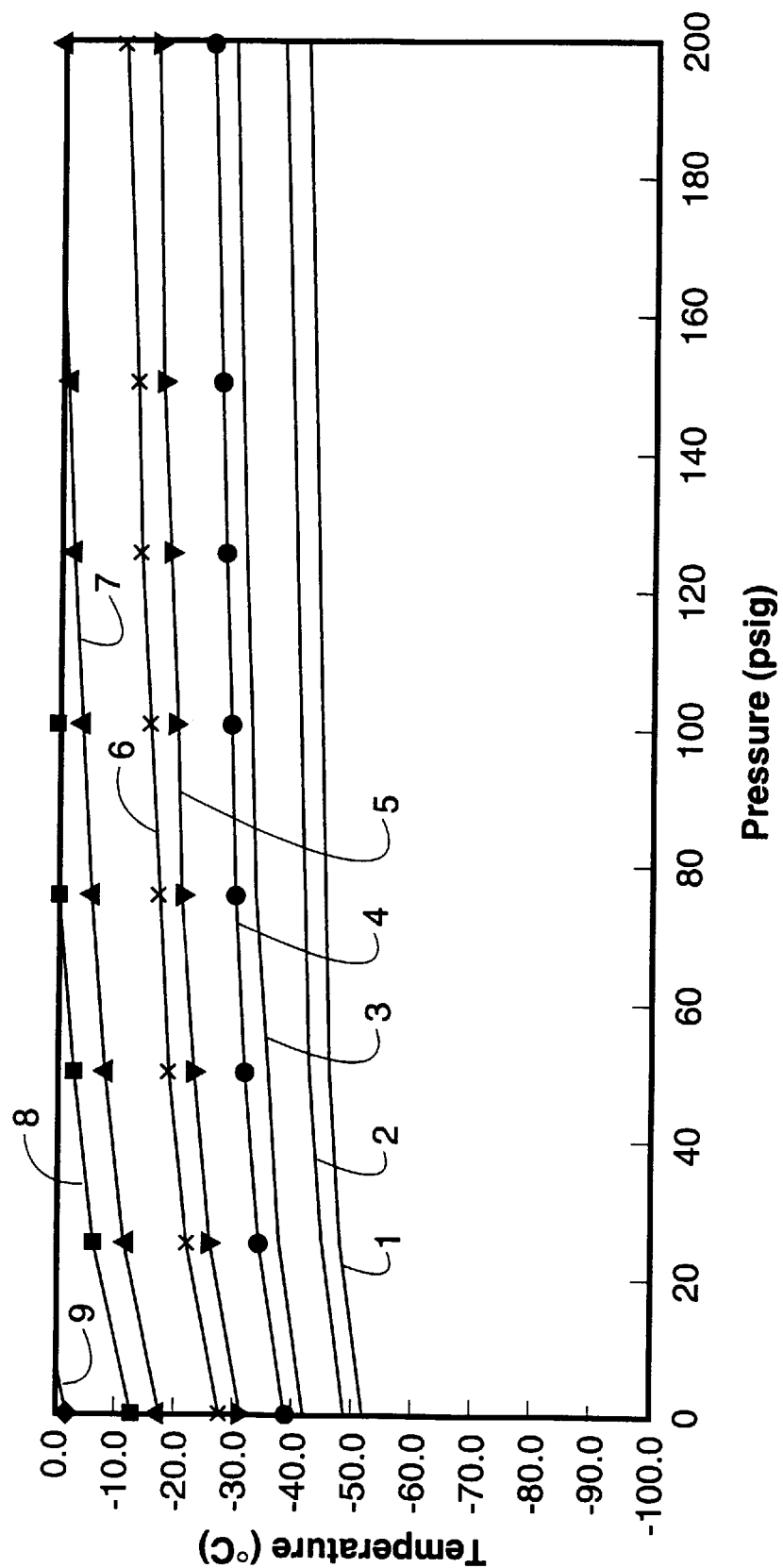
FIG. 3 is a chart showing the relationship between pressure (ordinate) in psig and temperature (abscissa) in °C. necessary to achieve 75% chlorine recovery when the input gas contains 0.01 (curve 1), 0.02 (curve 2), 0.10 (curve 3), 0.20 (curve 4), 1 (curve 5), 2 (curve 6), 10 (curve 7), 20 (curve 8), and 100 (curve 9) vol % chlorine.

The curves shown in FIGS. 1, 2, and 3 were calculated from extrapolated vapor pressure data available in the literature.

DESCRIPTION OF THE PREFERRED EMBODIMENTS

While the method of this invention is applicable to mixtures of gases containing a wide range of chlorine, it is particularly applicable to gases containing about 0.5 to about 60 vol % chlorine as it is less effective at concentrations below 0.5 vol % and at over 60 vol % other techniques for separating chlorine may work better. The process of this invention is particularly preferred for mixtures of gases containing about 3 to about 12 vol % chlorine because other techniques for separating chlorine from a mixture of gases do not work well in that range. Examples of other common gases that may be in the mixture with chlorine include carbon dioxide, hydrogen, oxygen, nitrogen, and mixtures thereof. These gas mixtures can be the result of chlorine manufacturing processes that include, for example, compression and liquification. Also, the gas stream that comes from a chlorine rail car that is being depressurized or purged can contain mixtures of gases that include chlorine.

In the first step of the process of this invention, the mixture of gases is cooled to a temperature below 0° C. to keep the water in a solid (ice) form. A temperature of about −70 to about −10° C. is preferred as that temperature range tends to result in the recovery of more chlorine from the gas mixture. The pressure of the mixture of gases is also important since a higher pressure will more readily form chlorine hydrate. The amount of chlorine hydrate that forms is also a function of the chlorine content of the mixture of gases. The effect on chlorine recovery of the temperature of the mixture of gases, the pressure on the mixture of gases, and the volume percent of chlorine in the mixture of gases is given in the accompanying drawings. The drawings show that temperature and vol % chlorine in the mixture of gases is very important to achieving a high recovery, while pressure is less important. Nevertheless, a pressure of about 345 to about 1034 kPa (about 50 to about 150 psig) is preferred to enhance chlorine recovery, as at a lower pressure the process is not as economical and higher pressures can present equipment problems.

The cold mixture of gases is contacted with ice. This can be accomplished either by forming the ice in situ by, for example, spraying water into the frigid mixture of gases, or it can be accomplished by passing the mixture of gases through a bed of ice. The ice is preferably finely divided to present more surface area to the gases. When the cold mixture of gases contacts the ice, chlorine hydrate forms on the ice. Chlorine hydrate contains varying amounts of water but the general formula for it is usually given as $Cl_2 \cdot nH_2O$, where "n" is 6 to 10.

Once the chlorine hydrate has formed, which occurs immediately after the chlorine contacts the ice, the ice is separated from the mixture of gases. The pressure on the separated ice is then relieved or the ice is warmed or both, which results in the release of chlorine from the chlorine hydrate. It is preferable to dry the "freed" chlorine, and this can be accomplished, for example, by passing the chlorine through concentrated sulfuric acid. The water, which contains some hypochlorite resulting from the melted ice, can be recycled.

The following examples further illustrate this invention.

EXAMPLE 1

A thin film of ice crystals was formed in a condenser tube by chilling the tube to −9.3° C. and passing nitrogen gas saturated with water through it. This ice was chlorinated with 100% $Cl_2$ at that temperature for several hours at a flow rate of 150.5 mL/min. The chlorine gas remaining in the equipment was purged using cold nitrogen until the gas stream did not react with a potassium iodide solution. The nitrogen purge stream was also monitored quantitatively for chlorine with KI solution so that all of the chlorine gas in the system could be accounted for.

The ice was warmed to 20° C. and the water that formed was dissolved in a potassium iodide solution and titrated with sodium thiosulfate to determine its chlorine content. Using this procedure, a very small amount of chlorine was found; a repetition of the test produced similar results. Since a large excess of chlorine was used, the chlorine hydrate yields were based on the amount of ice that was evenly formed along the walls of the condenser tube. The yield obtained during the first run was 0.7% and the yield obtained during the second run was 0.2%. The experimental parameters for both determinations are shown in the following table:

| Low Temperature Chlorination of Ice Reaction Parameters | | |
|---|---|---|
| Parameter | Reaction #1 | Reaction #2 |
| Saturated $N_2$ Flow Rate | 739.5 mls/min. | 813.4 mls/min. |
| Condenser Temperature | −8.7° C. | −9.3° C. |
| Wt. Of Ice Formed | 4.00 gms. | 1.39 gms. |
| Condenser Tube Area | 1.215 sq. In. | 1.215 sq. In. |
| Chlorine Flow Rate | 150.5 mls/min. | 150.5 mls/min. |
| Chlorine Added | 63.59 gms. | 137.21 gms. |
| $N_2$ Purge Rate | 394.4 mls/min. | 493 mls/min. |
| Purge Volume in Equipment | 1572 mls | 66 mls. |
| Wt. Of Water Recovered (Melt) | 4.00 gms. | 1.39 gms. |
| Wt. Of Chlorine Recovered | 0.0146 gms. | 0.001082 gms. |
| Hydrate Wt. Formed | 0.0442 gms. | 0.00327 gms. |
| Hydrate Yield Based on 100% Ice Reacting with $Cl_2$ | 0.740% | 0.157% |

Since the chlorine recovery was so small, the hydrate formed under these conditions was probably limited to the top surface layer of the ice crystals. In addition, nitrogen purging likely decomposed much of the chlorine hydrate by simple vapor pressure considerations. This example demonstrates that chlorine reacts with ice.

EXAMPLE 2

Two additional experiments were completed. In one experiment, 44.98 g of snow was chlorinated in a "cold finger" trap at −8.6° C., and in the other experiment some 31.34 g of crushed ice were chlorinated at −11.1° C. In the snow experiment, the recovery yield was only 0.1%, based on the amount of snow that was available to react with the excess chlorine. In the other experiment, several pieces of ice were directly removed from the partially submerged coldfinger using forceps, placed in a tared weighing bottle, and the contents were reacted with KI solution. The resulting titration again confirmed a low 0.2% hydrate yield. Since there were some concerns that the cold nitrogen purge, used to sweep out unreacted chlorine gas (234 mL), might also remove some of the chlorine hydrate, this purge was not employed in a second snow chlorination.

For the second snow experiment, the snow was carefully arranged in the coldfinger so as to maximize the exposed surface area to the chlorine gas. In this case, the total contents of the coldfinger (14.85 g of chlorinated snow and unreacted gas) after chlorination at −11.1° C. were reacted, in stages, with KI solution. The resulting solutions were built up to known volumes before being titrated. After subtracting for the chlorine gas volume, the resulting chlorine hydrate yield was calculated to be 11.8%.

In order to determine if chlorine hydrate had actually formed, a known weight (0.37 g) of chlorinated snow was removed from the coldfinger at −11.1° C. and added to a flask containing ice water at 0° C. About one half of the crystals sank to the bottom of the flask while the other half floated on the surface. A control test was also conducted, using the same type of snow, and all of the snow crystals floated until they melted. Another weighed sample (1.06 g) was placed in a stoppered flask while the flask was cooled to 5° C. in a constant temperature bath. Granules having a water white to a slight green tint color were observed to completely melt over a 25 minute period at this temperature. The melting point for chlorine hydrate, $Cl_2 \cdot 7.27H_2O$, is reported in the literature as 28.3±0.1° C. However, if the chlorine hydrate formation is a surface reaction, then the snow crystals can, at 5° C., melt from the inside out, thereby slowly dissolving the chlorine hydrate in the resulting snow melt. This example demonstrates that chlorine reacts with ice to form chlorine hydrate.

EXAMPLE 3

Two successful attempts were also completed to form chlorine hydrate in the conventional manner by bubbling chlorine gas (360.8 ml/min) into cold (+0.25° C.) water. In each case, a 500 ml gas washing bottle, surrounded by an ice bath, was employed as a chlorine hydrate reactor. In the first case, a coarse glass fritted disc was used as the gas dispersion tube and this was later replaced with a glass bulb fitted with small holes. A magnetic stirring bar was also used to keep the water mixing during the chlorination. In both runs, the bottom of the gas addition point plugged before all the water (200 mL) had been converted to chlorine hydrate. During the chlorination, most of the chlorine hydrate formation occurred above the gas addition point and the subsequent chlorine hydrate resembled a foam that seemed to be carried upward by the gas lift and the stirring action. Some of the chlorine hydrate crystals or slivers did form in the water layer but the majority was in the foam area. This unexpected foam layer occupied a volume of 284 mL (3.5 inches×2.5 inches) or more than twice the remaining water volume.

The best yield (25.14%) for the chlorine hydrate formation was calculated, by the weight gain, based on the amount of chlorine added to the system (21.43 g). The amount of unreacted gas remaining in the dry traps and the amount dissolved in the remaining water volume (117 mL) was taken into account. This example confirms that chlorine reacts with liquid water to form chlorine hydrate under the right conditions.

EXAMPLE 4

In an additional set of experiments, attempts were made to determine the minimum chlorine concentration in a mixed gas stream that would sustain chlorine hydrate formation under atmospheric conditions. Chlorine hydrate was again formed by slowly passing pure chlorine through chilled water (0.5° C.) until the hydrate foam occupied most of the volume in the 500 mL gas scrubber. At this time, the chlorine concentration was reduced to a 5 vol % $Cl_2$+95 vol % $N_2$ gas mixture. After 42 minutes of using this dilute gas stream at a feed rate of 1003 mL/min, all traces of chlorine hydrate had disappeared. The scrubber water was titrated and found to contain only 0.113 g/L as NaOCl. This indicated that the "stripping action" of the nitrogen combined with the low chlorine concentration would make any chlorine hydrate formation under these conditions improbable.

This premise was further enhanced by incrementally increasing the chlorine concentration from 28.6 vol % up to 75 vol % while lowering the nitrogen content accordingly, without observing any hydrate formation after 1.4 and 2 hours of gas addition. However, when the chlorine concentration was increased to 93 vol %, chlorine hydrate was again formed after 23 minutes of gas sparging at a total flow rate of 452 mL/min at 0.5° C. Once again the chlorine concentration was diluted down to 20.9 vol % with nitrogen at a combined flow rate of 480 mL/min and the gas was bubbled through the chlorine hydrate and water mixture at 0.5° C. After 55 minutes, there were no traces of any chlorine hydrate left in the gas washing bottle.

A small stream from a commercial electrolytic cell producing chlorine vent gas containing approximately 4 vol % $Cl_2$ was bubbled through chilled water (1° C.) at atmospheric pressure for several hours, on at least two occasions, without any chlorine hydrate formation being observed. Apparently, the chlorine solubility was depressed to such an extent by the inert gases present (nitrogen, oxygen, carbon dioxide, and hydrogen) that the solubility limit for chlorine hydrate was not obtained. The chlorine content of the water under these conditions was found to be 625 ppm, as NaOCl. This example demonstrates that chlorine does not react with liquid water to form chlorine hydrate at % $Cl_2$ levels less than 75%.

We claim:

1. A process for separating chlorine gas from a mixture of gases comprising
   (A) cooling said mixture of gases to less than 0° C.;
   (B) contacting said mixture of gases with ice, whereby chlorine hydrate forms on said ice;
   (C) separating said ice from said mixture of gases; and
   (D) heating said ice, lowering the pressure on said ice, or heating said ice and lowering the pressure on said ice, to release said chlorine gas from said chlorine hydrate.

2. A process according to claim 1 wherein water is sprayed into said mixture of gases forming said ice in situ.

3. A process according to claim 2 wherein said mixture of gases contains chlorine and gases selected from the group consisting of carbon dioxide, hydrogen, oxygen, nitrogen, and mixtures thereof.

4. A process according to claim 2 wherein said mixture of gases is under a pressure of about 345 to about 1034 kPa.

5. A process according to claim 2 including the additional last step of drying said chlorine gas.

6. A process according to claim 1 wherein said mixture of gases is passed through a bed of ice.

7. A process according to claim 6 wherein said mixture of gases contains chlorine and gases selected from the group consisting of carbon dioxide, hydrogen, oxygen, nitrogen, and mixtures thereof.

8. A process according to claim 6 wherein said mixture of gases is under a pressure of about 345 to about 1034 kPa.

9. A process according to claim 6 including the additional last step of drying said chlorine.

10. A process for separating chlorine gas from a mixture of gases containing about 0.5 to about 60 vol % chlorine comprising
    (A) cooling said mixture of gases to about −70 to about −10° C.;
    (B) contacting said cooled mixture of gases at a pressure of about 345 to about 1034 kPa with ice, whereby chlorine hydrate forms on said ice;
    (C) separating said ice from said mixture of gases; and
    (D) heating said ice, lowering the pressure of said ice, or heating said ice and lowering the pressure on said ice, to release chlorine gas from said chlorine hydrate.

11. A process according to claim 10 wherein water is sprayed into said mixture of gases forming said ice in situ.

12. A process according to claim 11 wherein said mixture of gases contains chlorine and gases selected from the group consisting of carbon dioxide, hydrogen, oxygen, nitrogen, and mixtures thereof.

13. A process according to claim 11 including the additional last step of passing said chlorine gas through concentrated sulfuric acid.

14. A process according to claim 10 wherein said mixture of gases is passed through a bed of ice.

15. A process according to claim 14 wherein said mixture of gases contains chlorine and gases selected from the group consisting of carbon dioxide, hydrogen, oxygen, nitrogen, and mixtures thereof.

16. A process according to claim 14 including the additional last step of passing said chlorine gas through concentrated sulfuric acid.

17. A process for separating chlorine gas from a mixture of gases containing about 3 to about 12 vol % chlorine and gases selected from the group consisting of carbon dioxide, hydrogen, oxygen, nitrogen, and mixtures thereof, comprising
    (A) cooling said mixture of gases to about −70 to about −10° C.;
    (B) contacting said mixture of gases at a pressure of about 345 to about 1034 kPa with ice, whereby chlorine hydrate forms on said ice;
    (C) separating said ice from said mixture of gases; and
    (D) heating said ice, lowering the pressure on said ice, or heating said ice and lowering the pressure on said ice, to release chlorine gas from said chlorine hydrate; and
    (E) drying said chlorine gas.

18. A process according to claim 17 wherein water is sprayed into said mixture of gases forming said ice in situ.

19. A process according to claim 17 wherein said mixture of gases is passed through a bed of ice.

20. A process according to claim 17 wherein said chlorine gas is dried by passing it through concentrated sulfuric acid.

* * * * *